United States Patent [19]

Nagayoshi et al.

[11] Patent Number: 4,998,563
[45] Date of Patent: Mar. 12, 1991

[54] PLASTIC PIPE

[75] Inventors: Akio Nagayoshi; Kiyoharu Nagayoshi, both of Sakai, Japan

[73] Assignee: UC Industry Co., Ltd., Osaka, Japan

[21] Appl. No.: 479,899

[22] Filed: Feb. 13, 1990

Related U.S. Application Data

[60] Continuation of Ser. No. 292,075, Dec. 30, 1988, abandoned, Division of Ser. No. 163,687, Mar. 3, 1988, Pat. No. 4,824,502.

[30] Foreign Application Priority Data

| Mar. 6, 1987 | [JP] | Japan | 62-52289 |
| Mar. 6, 1987 | [JP] | Japan | 62-52290 |
| Apr. 21, 1987 | [JP] | Japan | 62-98372 |
| Jun. 9, 1987 | [JP] | Japan | 62-144459 |

[51] Int. Cl.$^5$ .................................... F16L 11/08
[52] U.S. Cl. .................................... 138/122; 138/129; 138/154
[58] Field of Search ............... 138/121, 122, 154, 173, 138/129; 174/47; 156/195, 190, 244.15, 429

[56] References Cited

U.S. PATENT DOCUMENTS

| 4,203,476 | 5/1980 | Vitellaro | 138/154 |
| 4,303,104 | 12/1981 | Hegler et al. | 138/173 |
| 4,354,051 | 10/1982 | Kutnyak | 138/129 |
| 4,487,232 | 12/1984 | Kanao | 138/154 |
| 4,759,389 | 7/1988 | Suck | 138/154 |

Primary Examiner—James E. Bryant, III
Attorney, Agent, or Firm—Armstrong, Nikaido, Marmelstein, Kubovcik & Murray

[57] ABSTRACT

A plastic pipe having spiral ridges on an outer surface and a continuous, cylindrical inner surface formed by a spiral wound plastic ribbon having at least one ridge-shaped hollow deformation extending longitudinally of the ribbon and spirally of the pipe. The outer radial surface of the hollow deformations are slit and sealed with a ribbon. Side portions extend from the opposite sides of the hollow deformations and are fused to each other to form the cylindrical inner surface.

6 Claims, 3 Drawing Sheets

PLASTIC PIPE

This is a continuation of application Ser. No. 292,075, filed Dec. 30, 1988, abandoned, in turn a division of application Ser. No. 163,681, filed Mar. 3, 1988, now U.S. Pat. No. 4,824,502, dated Apr. 25, 1989 and relates to a so-called corrugated plastic pipe having a spiral ridge on an outer surface thereof such as made by the method and apparatus of U.S. Pat. No. 4,824,502, the disclosure of which is incorporated herein, by reference.

Corrugated plastic pipes having a hollow spiral ridge on an outer surface and a flat inner surface have been getting wider applications in houses and other constructions.

It is generally difficult to form a hollow spiral ridge on the outer surface of plastic pipe without suffering from the deformation of the spiral ridge. This is because a plastic ribbon to be formed into the plastic pipe is in a softened state, namely in a state which enables the adjacent plastic ribbons to be fused with each other when overlapped. The use of a forming core belt can avoid such deformation of the spiral ridge, but it suffers from the disadvantage that a plastic pipe containing the forming core belt is generally heavy and not easy to bend.

OBJECT AND SUMMARY OF THE INVENTION

An object of the present invention is, therefore, to provide a corrugated plastic pipe having a hollow, spiral ridge on an outer surface and a flat inner surface.

The inventors have found that such a corrugated plastic pipe can be produced by using a forming core belt to ensure the formation of a spiral ridge of accurate shape, by cutting the resulting spiral ridge and removing the forming core belt and closing the cut ridge with a plastic ribbon.

Thus, the plastic pipe having a spiral ridge on an outer surface and a flat inner surface according to the present invention is constituted by a spirally wound plastic ribbon comprising at least one ridge-shaped hollow deformation extending longitudinally of the ribbon and provided with a slit extending longitudinally of the spiral ridge and flat portions extending on both sides of the ridge-shaped deformation, at least adjacent plastic ribbons being fused with each other in the flat portions so that the fused flat portions provide a flat inner surface covering the bottom of the spiral ridge, with the longitudinal slit sealed with a second plastic ribbon fused to the spiral ridge.

DETAILED DESCRIPTION OF THE INVENTION

The corrugated plastic pipe of the present invention is formed by spirally winding an elongated plastic ribbon A around forming rolls while the plastic ribbon is in a softened state. This can be accomplished just after plastic ribbon A is extruded or by heating a pre-formed ribbon to the softened state.

Figure 1:
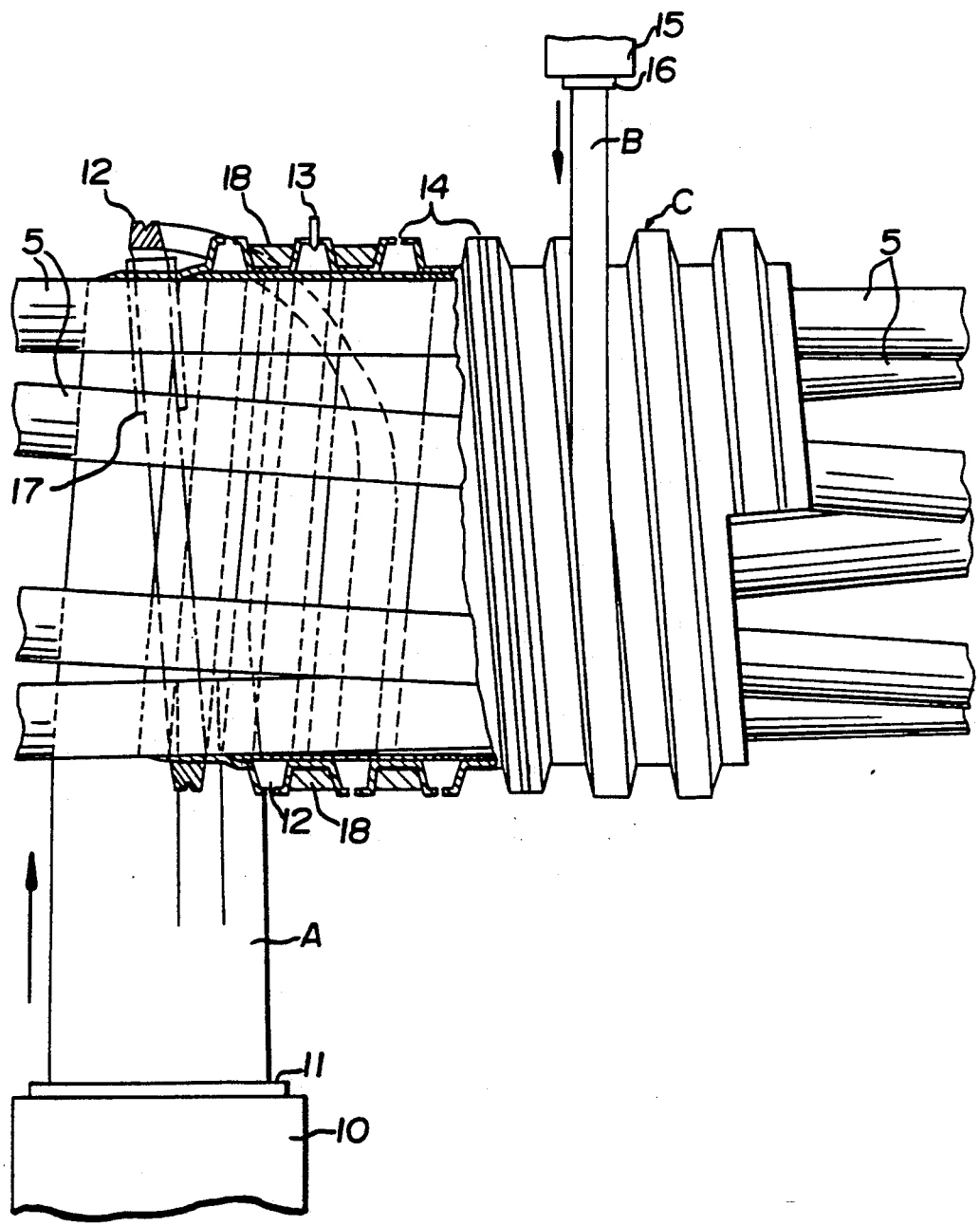
FIG. 1 is a side view partially in section showing the plastic pipe according to one embodiment of the present invention.

As shown in FIG. 1, as softened plastic ribbon A is spirally wound, an endless forming core belt 12 is sandwiched between the plastic ribbon already formed and the newly supplied softened ribbon and, with softened plastic ribbon A, is spirally wound. The side edges of plastic ribbon A, as such ribbon is spirally wound, are overlapped and fused to each other. After several turns, spirally wound plastic ribbon A cools and is solidified. When sufficiently solidified, the spiral ridge is cut at 14, the forming core belt 12 is removed and a second plastic ribbon B, similarly in a softened state to plastic ribbon A, and of a width sufficient to cover the cut slit 14, is applied and fused to the spiral ridge, thereby sealing the slit. Corrugated plastic pipe having a sealed hollow spiral ridge on an outer surface and a flat inner surface can be manufactured continuously.

Methods and apparatus which may be used for producing the sealed hollow spiral ridge corrugated plastic pipe of the instant invention are, as noted above, shown and described in co-pending U.S. Pat. No. 4,824,502, incorporated herein by reference.

Figure 2:
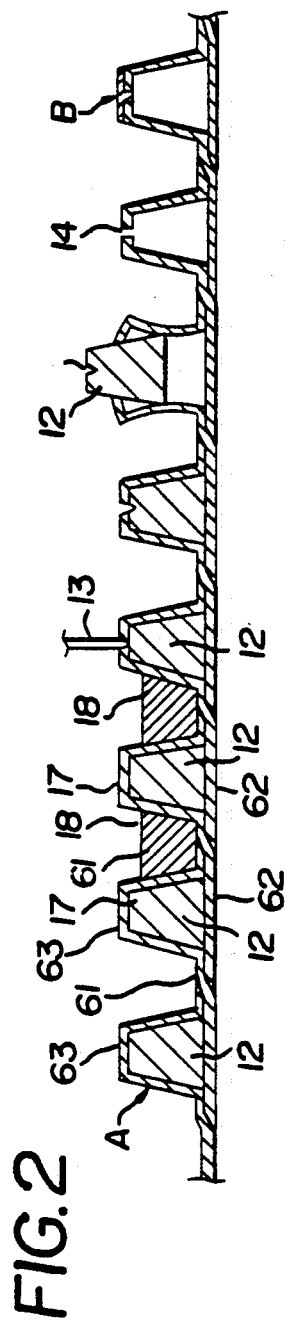
FIG. 2 is an enlarged cross-sectional view of the plastic pipe of FIG. 1.
Figure 3:
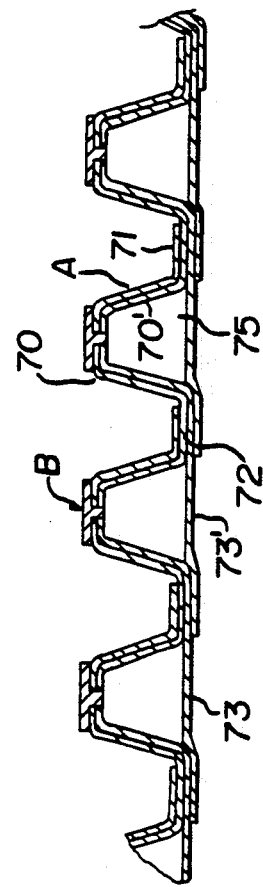
FIG. 3 is an enlarged cross-sectional view showing a spiral ridge of the plastic pipe of another embodiment of the invention.

As best shown in FIGS. 2 and 3, the plastic ribbon A has a ridge-shaped deformation 60, a narrow side portion 61 at one side of ridge-shaped deformation 60 and a wide side portion 62 at the other, or opposite side of ridge-shaped deformation 60. Ridge-shaped deformation 60 has a trapezoidal cross section, with a top wall 63 which is cut and sealed with ribbon B extending into cut 14 and extending across top wall 63 and down the sidewalls.

The side portions 61, 62 of plastic ribbon A are spirally overlapped so that the narrow side portion 61 and part of the wide side portion 62 of the plastic ribbon A are fused to the wide side portion 62 of the preceding plastic ribbon spiral. For this purpose, the narrow side portion 61 may be called the "front side portion," and the wide side portion 62, the "rear side portion." The wide side portions 62 of adjacent ribbons, when fused together, form a continuous inner surface of the spirally formed pipe with the hollow deformations 60 on the outer surface of the pipe.

As schematically shown in FIG. 2 and as explained above, the narrow (front) side portion 61 and part of the wide (rear) side portion 62 of the plastic ribbon A is fused to the wide (rear) side portion 62 of the preceding plastic ribbon A. The spiral ridge are slit at 14, the forming core belt is removed and spiral ridge thus produced is coated with the narrow plastic ribbon B fused thereto and completely sealing the slit 14.

FIG. 3 shows in enlarged detail a typical example of the spiral ridge 60 coated with the narrow plastic ribbon B. Since the narrow plastic ribbon B is fused to the top wall 63 of the spiral ridge 60, the slit 14 is filled with part of the narrow plastic ribbon B.

Figure 4:
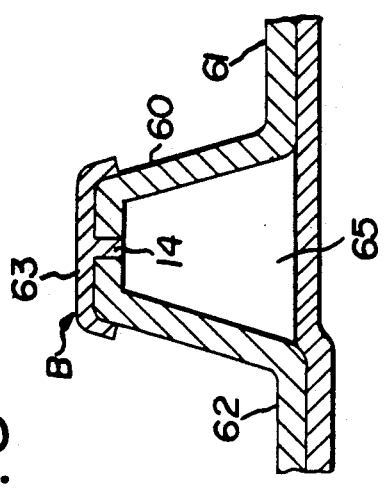
FIG. 4 is an enlarged cross-sectional view of the spiral ridge of the plastic pipe showing still another embodiment.

In the modification shown in FIG. 4, the plastic ribbon A has two ridge-shaped deformation 70, 70', a narrow side portion 71, a wide side portion 73 and an intermediate portion 72. The ridge-shaped deformation 70 covers the underlying ridge-shaped deformation 70' of the preceding previously wound plastic ribbon A and the intermediate portion 72 and the wide side portion 73 of the plastic ribbon A are fused to the wide side portion 73' of the preceding plastic ribbon. Also, the narrow side portion 71 of the plastic ribbon A is fused to the intermediate portion 72' of the preceding plastic ribbon. Thus, the plastic ribbon is continuously overlapped and fused to form the plastic pipe with a single spiral ridge. The spiral ridge is cut to form a slit 14 passing through the overlapping and fused spirals and the slit 14 of the spiral ridge is sealed by a narrow plastic ribbon B fused to the spiral ridge. The spiral ridge 75 thus completed is hollow.

FIGS. 5-8 show the plastic ribbons A coated with various plastic ribbons B to seal the slits. In any case, what is important is to completely cover the slit with the narrow plastic ribbon B.

Figure 5:
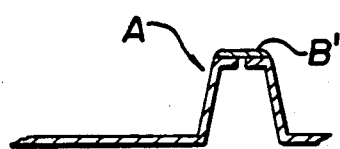
FIGS. 5-8 are enlarged cross-sectional views of the plastic ribbons of still further embodiments of the invention.

In FIG. 5, sealing ribbon B' is narrow, covers the top portion and the slit 14 but does not extend into the slit. The edges of ribbon B' are rounded.

Figure 6:
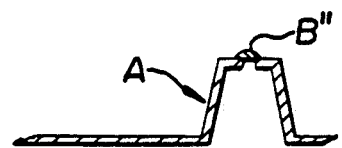

In FIG. 6, sealing ribbon B" is narrower than sealing ribbon B', does not extend into the slit but is sealed to the top portion at the opposite sides of the slit.

Figure 7:
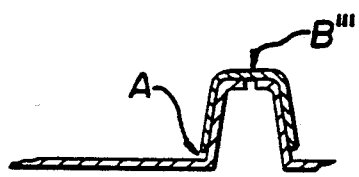

In FIG. 7, sealing ribbon B'" extends across the top and down the outer walls a both sides hollow spiral ridge.

Figure 8:
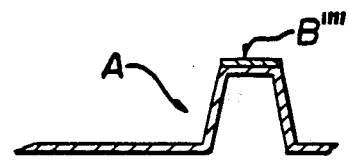

In FIG. 8, as in FIG. 5, sealing ribbon B"" covers the top portion and the slit. The edges of ribbon B"" are square.

Figure 9:
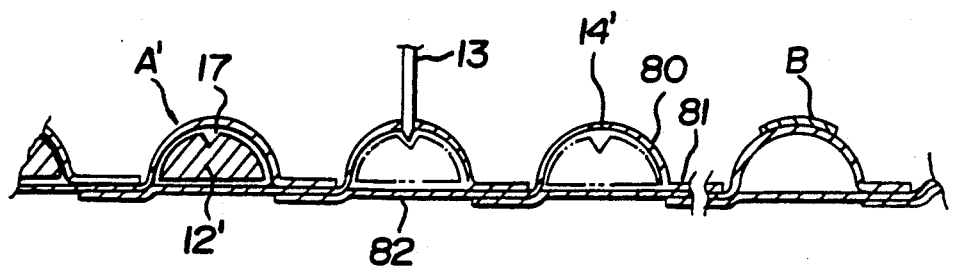
FIGS. 9 and 10 are enlarged cross-sectional views showing a spiral ridge of the plastic pipe of still other further embodiments of the invention.

In the embodiment of FIG. 9, the hollow spiral ridges 80 on the outer surface of the corrugated plastic pipe A' are of semicircular cross section, a cut 14' extending longitudinally at the approximate center of ridge 80 with a longitudinally extending ribbon B covering and closing cut 14'. Side portions 81, 82 of ribbon A' are spirally overlapped so that the narrow side portion 81 and part of the wide side portion 82 are fused to the wide side portion 82 of the preceding ribbon spiral.

Figure 10:
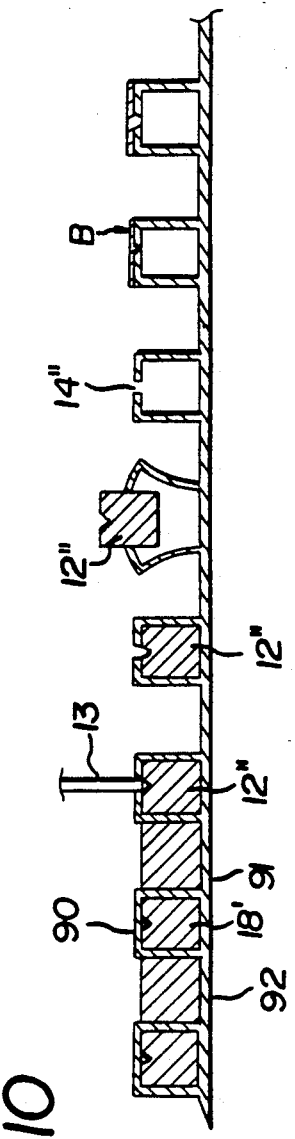

In the embodiment of FIG. 10, ribbon A" is formed such as by extrusion with a core 12" therein, with a rectangular or square cross-section ridge-shaped deformation 90 and with a continuous bottom wall having a wide tapered end portion 91 at the front side of deformation 90 as the ribbon is spiraled to form the continuous corrugated pipe and a narrow tapered end portion 92 at the rear side of deformation 90 as the ribbon is spiraled. As best seen in FIG. 10, the tapers of end portions 91, 92 are reversed so that, when abutted in the soften state of the plastic ribbon, the tapered ends fuse to form a smooth continuous lining in the spirally wound pipe. The top or outer surface of deformation 90 is cut longitudinally at 14" and, after belt 14" is removed, is sealed with ribbon B as in the other embodiments.

The plastic ribbon A and the narrow plastic ribbon B used in the present invention may be made of various thermoplastic resins such as polyethylene, polypropylene and other polyolefins, polyvinyl chloride, etc. The plastic ribbon A and the narrow plastic ribbon B may be made of the same materials, but it is possible that the plastic ribbon A is made of soft resins and the narrow plastic ribbon B is made of relatively hard resins.

Although the attached figures show relatively uneven inner surfaces of the plastic pipes, this is to emphasize the relation of adjacent plastic ribbons in the plastic pipe of the present invention, and that their inner surfaces are substantially flat because the plastic ribbons are deformed, when it is sufficiently soft, by the forming rolls in the spiral winding operation.

The present invention has been explained referring to the attached drawings, but it should be noted that it is not restricted thereto and that any modifications and changes are possible unless they deviate from the scope of the present invention defined by the claims attached hereto.

What is claimed is:

1. A plastic pipe having a spiral ridge on an outer surface and a continuous, cylindrical inner surface, constituted by an elongated plastic ribbon spirally wound and comprising at least one ridge-shaped hollow deformation extending longitudinally of said elongated ribbon and, spirally and outwardly of said continuous, cylindrical inner surface and provided with a slit extending longitudinally of said elongated ribbon and through an outer,. radial surface of said spiral ridge hollow ridge-shaped deformation, a first side portion extending on one side of said ridge-shaped deformation and a second side portion extending on the other and opposite side of said ridge-shaped deformation, said first and second side portions adjacent plastic ribbon spirals being fused with each other in said continuous, cylindrical inner surface so that said fused portions form said continuous, cylindrical, inner surface and cover the bottom of said hollow ridge-shaped deformation, said longitudinal slit being sealed with a second plastic ribbon fused to the exterior of said spiral ridge.

2. The plastic pipe according to claim 1, wherein said plastic ribbon comprises one said ridge-shaped deformation extending longitudinally of said elongated ribbon and said first side portion being a narrow side portion extending on one side of said ridge-shaped hollow said deformation, and said second side portion being a wide, side portion extending on the other and opposite side of said ridge-shaped deformation, an inner side of said narrow side portion on said one side of said hollow deformation being fused to an outer side of said wide side portion of an immediately preceding plastic ribbon spiral so that the bottom of said spiral ridge is covered with said wide side portion of said immediately preceding plastic ribbon spiral.

3. The plastic pipe according to claim wherein said plastic ribbon comprises two said ridge-shaped hollow deformations each extending longitudinally of said elongated ribbon and each provided with a slit extending longitudinally of said elongated ribbon, said first side portion being a narrow side portion extending on one side of one of said ridge-shaped hollow deformations, a wide side portion extending on one side of the other of said ridge-shaped hollow deformations and a flat portion extending between said ridge-shaped hollow deformations, an inner side of said narrow side portion at said one side of said one of said deformations, being fused to said flat portion extending between said ridge-shaped hollow deformations on an immediately preceding plastic ribbon, an inner side of said flat portion extending between said hollow ridge-shaped deformations being fused to a portion of an inner side of a wide side portion on said immediately preceding plastic ribbon and an end portion of said inner side of said wide portion on said immediately preceding plastic ribbon being fused to an outer surface of said wide portion of said other of said ridge-shaped hollow deformations, said fused wide portions forming a continuous inner surface and closures over said hollow ridge-shaped deformations and the inner surface of said plastic pipe.

4. The plastic pipe according to claim 1, wherein said hollow ridge-shaped deformation has a substantially trapezoidal cross section.

5. The plastic pipe according to claim 1, wherein said hollow ridge-shaped deformation has a semicircular cross section.

6. The plastic pipe according to claim 1, wherein said hollow ridge-shaped deformation has a rectangular cross section.

* * * * *

UNITED STATES PATENT AND TRADEMARK OFFICE
CERTIFICATE OF CORRECTION

PATENT NO. : 4,998,563
DATED : March 12, 1991
INVENTOR(S) : Akio NAGAYOSHI et al It is certified that error appears in the above-identified patent and that said Letters Patent is hereby corrected as shown below:

On the title page, Item [73], insert -- Tonen Sekiyukagaku Kabushiki Kaisha, Tokyo, Japan -- and On the title page, Item [60], second line, "163,687" should read -- 163,681 --.

Signed and Sealed this

Twenty-second Day of September, 1992

Attest:

DOUGLAS B. COMER

*Attesting Officer*     Acting Commissioner of Patents and Trademarks